(12) United States Patent
Gauthier et al.

(10) Patent No.: US 10,325,097 B2
(45) Date of Patent: Jun. 18, 2019

(54) STATIC DETECTION OF CONTEXT-SENSITIVE CROSS-SITE SCRIPTING VULNERABILITIES

(71) Applicant: Oracle International Corporation, Redwood Shores, CA (US)

(72) Inventors: Francois Gauthier, Brisbane (AU); Antonin Steinhauser, Hradiste (CZ)

(73) Assignee: Oracle International Corporation, Redwood Shores, CA (US)

( * ) Notice: Subject to any disclaimer, the term of this patent is extended or adjusted under 35 U.S.C. 154(b) by 247 days.

(21) Appl. No.: 15/281,447

(22) Filed: Sep. 30, 2016

(65) Prior Publication Data

US 2018/0025161 A1 Jan. 25, 2018

Related U.S. Application Data

(60) Provisional application No. 62/364,191, filed on Jul. 19, 2016.

(51) Int. Cl.
  *G06F 21/57* (2013.01)
  *G06F 21/12* (2013.01)
  *H04L 29/06* (2006.01)

(52) U.S. Cl.
  CPC ............ *G06F 21/577* (2013.01); *G06F 21/12* (2013.01); *H04L 63/1433* (2013.01); *G06F 2221/033* (2013.01)

(58) Field of Classification Search
  CPC .. G06F 21/577; G06F 21/12; G06F 2221/033; H04L 63/1433
  See application file for complete search history.

(56) References Cited

U.S. PATENT DOCUMENTS

| 7,530,107 B1 * | 5/2009 | Ono | G06F 21/577 717/154 |
| 7,975,296 B2 * | 7/2011 | Apfelbaum | G06F 21/577 726/22 |

(Continued)

OTHER PUBLICATIONS

Balzarotti, D. et al., "Saner: Composing Static and Dynamic Analysis to Validate Sanitization in Web Application"; Published in Security and Privacy, 2008, IEEE Symposium on; May 18-22, 2008; pp. 387-401 (15 pages).

(Continued)

*Primary Examiner* — Joseph P Hirl
*Assistant Examiner* — J. Brant Murphy
(74) *Attorney, Agent, or Firm* — Ferguson Braswell Fraser Kubasta PC

(57) ABSTRACT

A method for statically analyzing a web application program may include obtaining a control flow graph for the web application program. Each control flow graph node may correspond to a statement in the web application program. The method may further include obtaining a sanitizer sequence including one or more sanitizers followed by an output statement, obtaining a placeholder corresponding to the sanitizer sequence, and generating control flow paths including an output node that corresponds to the output statement. The method may further include generating documents for each control flow path. Each document may include a sanitized value corresponding to the output statement. The method may further include inserting the placeholder into each document at a location of the sanitized value, and reporting a potential cross-site scripting flaw when the sanitizer sequence is insufficient for the output context sequence of the sanitized value.

15 Claims, 10 Drawing Sheets

(56) References Cited

U.S. PATENT DOCUMENTS

| | | | | |
|---|---|---|---|---|
| 8,600,048 | B1* | 12/2013 | Hansen | G06F 21/62 380/28 |
| 8,881,293 | B1* | 11/2014 | Brucker | G06F 21/577 717/126 |
| 2003/0159063 | A1* | 8/2003 | Apfelbaum | G06F 21/577 726/25 |
| 2008/0127341 | A1* | 5/2008 | Chen | G06F 11/3608 726/22 |
| 2010/0083240 | A1* | 4/2010 | Siman | G06F 8/433 717/144 |
| 2011/0302566 | A1* | 12/2011 | Abadi | G06F 21/577 717/168 |
| 2012/0023486 | A1* | 1/2012 | Haviv | G06F 21/577 717/126 |
| 2012/0151592 | A1* | 6/2012 | Veanes | G06F 21/51 726/25 |
| 2012/0167209 | A1* | 6/2012 | Molnar | G06F 21/54 726/22 |
| 2014/0016469 | A1* | 1/2014 | Ho | H04L 47/38 370/235 |
| 2014/0237604 | A1* | 8/2014 | Guarnieri | G06F 21/577 726/25 |
| 2015/0082439 | A1* | 3/2015 | Molnar | G06F 21/54 726/23 |
| 2015/0096006 | A1* | 4/2015 | Chu | G06F 21/128 726/9 |
| 2015/0143064 | A1* | 5/2015 | Bhargava | G06F 11/1451 711/162 |

OTHER PUBLICATIONS

Christensen, A. S. et al., "Precise Analysis of String Expressions"; Published in Proceedings of the 10th International Static Analysis Symposium (SAS); Jun. 11-13, 2003, vol. 2694 of LNCS, pp. 1-18 (17 pages).

Gould, C. et al., "Static Checking of Dynamically Generated Queries in Database Applications", In Software Engineering, 2004, Proceedings of the 26th International Conference, IEEE, May 23-28, 2004, pp. 645-654 (10 pages).

Hooimeijer, P. et al., "Fast and Precise Sanitizer Analysis with BEK", In Proceedings of the 20th USENIX Conference on Security, San Francisco, CA, USA, Aug. 8-12, 2011 pp. 1-1 (16 pages).

Kirkegaard, C. et al., "Static Analysis for Java Servlets and JSP", BRICS Report Series, RS-06-10, Jun. 2006 (26 pages).

Livshits, B. et al., "Towards Fully Automatic Placement of Security Sanitizers and Declassifiers"; In Proceedings of the 40th Annual ACM SIGPLAN-SIGACT Symposium on Principles of Programming Languages, POPL "13, vol. 48, Issue 1, pp. 385-398, Jan. 2013 (14 pages).

Minamide, Yasuhiko, "Static Approximation of Dynamically Generated Web Pages", In Proceedings of the 14th International Conference on World Wide Web, WWW, May 10-14, 2005, pp. 432-441 (10 pages).

Saxena, P. et al., "Automatic Context-Sensitive Sanitization for Large-Scale Legacy Web Applications", In Proceedings of the 18th ACM Conference on Computer and Communications Security (CCS), Chicago, Illinois, USA, Oct. 17-21, 2011, pp. 601-614 (14 pages).

Samuel, M. et al., "Context-Sensitive Auto-Sanitization in Web Templating Languages Using Type Qualifiers", In Proceedings of the 18th ACM Conference on Computer and Communications Security (CCS), Chicago, Illinois, USA, Oct. 17-21, 2011, pp. 587-600 (14 pages).

Wassermann, G. et al., "Static Detection of Cross-Cite Scripting Vulnerabilities", In Proceedings of the 30th International Conference on Software Engineering, ICSE "08, Leipzig, Germany, May 10-18, 2008, pp. 171-180 (10 pages).

Weinberger, J. et al., "A Systematic Analysis of XSS Sanitization in Web Application Frameworks", In Proceedings of the 16th European Conference on Research in Computer Security (ESORICS "11), Leuven, Belgium, Sep. 12-14, 2011, pp. 150-171 (20 pages).

* cited by examiner

| HTML contexts |
|---|
| ⁞Text⁞ |
| ⁞Comment⁞ |
| ⁞Document type⁞ |
| ⁞Tag name⁞ |
| ⁞JavaScript data field |
| ⁞CSS data field |
| ⁞Attribute name⁞ |
| ⁞Attribute value in quotes representing a URI |
| ⁞Attribute value in apostrophes representing a URI |
| ⁞Unquoted attribute value representing a URI |
| ⁞Attribute value in quotes representing a CSS declaration |
| ⁞Attribute value in apostrophes representing a CSS declaration |
| ⁞Unquoted attribute value representing a CSS declaration |
| ⁞Attribute value in quotes representing a JavaScript event handler |
| ⁞Attribute value in apostrophes representing a JavaScript event handler |
| ⁞Unquoted attribute value representing a JavaScript event handler |
| ⁞Other attribute value in quotes⁞ |
| ⁞Other attribute value in apostrophes⁞ |
| ⁞Other unquoted attribute value⁞ |
| ⁞Unknown⁞ |

| CSS contexts |
|---|
| Charset in quotes⁞ |
| Charset in apostrophes⁞ |
| Entity name⁞ |
| Entity value in quotes⁞ |
| Entity value in apostrophes⁞ |
| Unquoted entity value⁞ |
| Media item⁞ |
| Property name⁞ |
| Property value⁞ |
| String in quotes⁞ |
| String in apostrophes⁞ |
| URI in quotes |
| URI in apostrophes |
| Unquoted URI |
| Unknown⁞ |

| JavaScript contexts |
|---|
| String in apostrophes⁞ |
| String in quotes⁞ |
| Code⁞ |

| URI contexts |
|---|
| Content type in data: scheme⁞ |
| CSS content of data: scheme |
| HTML content of data: scheme |
| JavaScript content of data: scheme |
| Other content of data: scheme⁞ |
| Unknown part of data: scheme⁞ |
| Javascript: scheme |
| Non data: or javascript: scheme⁞ |

⁞ Can start a context sequence

⁞ Terminates context sequence

STATIC DETECTION OF CONTEXT-SENSITIVE CROSS-SITE SCRIPTING VULNERABILITIES

CROSS-REFERENCE TO RELATED APPLICATION

This application claims benefit under 35 U.S.C. § 119(e) to U.S. Provisional Patent Application Ser. No. 62/364,191, filed on Jul. 19, 2016, and entitled "STATIC DETECTION OF CONTEXT-SENSITIVE CROSS-SITE SCRIPTING VULNERABILITIES." U.S. Provisional Patent Application Ser. No. 62/364,191 is incorporated herein by reference in its entirety.

BACKGROUND

Cross-site scripting flaws occur when attacker-controlled data is rendered in a victim's browser. The consequences of a cross-site scripting attack might vary from website defacing to identity theft. Web application developers typically prevent cross-site scripting (XSS) flaws by encoding or replacing potentially dangerous characters from potentially malicious scripts with harmless equivalents, a process known as sanitization. In web applications, sanitization routines vary with respect to the context in which the data is rendered. For example, data rendered in HTML must be sanitized differently than data rendered in JavaScript. Context-sensitive cross-site scripting flaws arise when a sanitizer is used in an inappropriate context. Unfortunately, sanitizer placement in web application code is a highly manual and error-prone process, making it difficult for developers to fully protect their code from XSS attacks. Indeed, a single missing sanitizer is often sufficient to make an application vulnerable to XSS attacks.

Several static and dynamic analysis approaches for the detection of missing sanitizers have been developed in recent years. One of the most successful approaches to detect missing sanitizers is taint analysis, which aims at identifying execution paths in a program where malicious inputs can reach sensitive instructions without being sanitized. Taint analysis thus aims at identifying execution paths that miss a sanitizer. Taint analysis is, however, insufficient to fully protect an application against XSS attacks. Ensuring that user inputs are sanitized before reaching security-sensitive instructions is necessary but not sufficient to prevent XSS flaws.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for statically analyzing a web application program including obtaining a control flow graph for the web application program. The control flow graph includes nodes. Each node corresponds to a statement in the web application program. The method further includes obtaining a sanitizer sequence including one or more sanitizers followed by an output statement, obtaining a placeholder corresponding to the sanitizer sequence, and generating control flow paths from an entry node of the control flow graph to an exit node of the control flow graph. Each control flow path includes an output node that corresponds to the output statement. The method further includes generating documents for each control flow path. Each document includes a sanitized value corresponding to the output statement. The method further includes inserting the placeholder into each document at a location of the sanitized value, determining whether the sanitizer sequence is sufficient for an output context sequence of the sanitized value in each document, and reporting a potential cross-site scripting flaw when the sanitizer sequence is insufficient for the output context sequence of the sanitized value.

In general, in one aspect, one or more embodiments relate to a system for statically analyzing a web application program including a processor and a memory including instructions that, when executed by the processor, cause the processor to obtain a control flow graph for the web application program. The control flow graph includes nodes. Each node corresponds to a statement in the web application program. The instructions further include obtaining a sanitizer sequence including one or more sanitizers followed by an output statement, obtaining a placeholder corresponding to the sanitizer sequence, and generating control flow paths from an entry node of the control flow graph to an exit node of the control flow graph. Each control flow path includes an output node that corresponds to the output statement. The instructions further include generating documents for each control flow path. Each document includes a sanitized value corresponding to the output statement. The instructions further include inserting the placeholder into each document at a location of the sanitized value, determining whether the sanitizer sequence is sufficient for an output context sequence of the sanitized value in each document, and reporting a potential cross-site scripting flaw when the sanitizer sequence is insufficient for the output context sequence of the sanitized value. The system further includes a repository, configured to store at least the web application program.

In general, in one aspect, one or more embodiments of the invention relate to a non-transitory computer readable medium including instructions that, when executed by a processor, perform a method for statically analyzing a web application program including obtaining a control flow graph for the web application program. The control flow graph includes nodes. Each node corresponds to a statement in the web application program. The method further includes obtaining a sanitizer sequence including one or more sanitizers followed by an output statement, obtaining a placeholder corresponding to the sanitizer sequence, and generating control flow paths from an entry node of the control flow graph to an exit node of the control flow graph. Each control flow path includes an output node that corresponds to the output statement. The method further includes generating documents for each control flow path. Each document includes a sanitized value corresponding to the output statement. The method further includes inserting the placeholder into each document at a location of the sanitized value, determining whether the sanitizer sequence is sufficient for an output context sequence of the sanitized value in each document, and reporting a potential cross-site scripting flaw when the sanitizer sequence is insufficient for the output context sequence of the sanitized value.

Other aspects of the invention will be apparent from the following description and the appended claims.

BRIEF DESCRIPTION OF DRAWINGS

FIG. 5, FIG. 6, and FIG. 7 show examples in accordance with one or more embodiments of the invention.

DETAILED DESCRIPTION

Figure 1A:
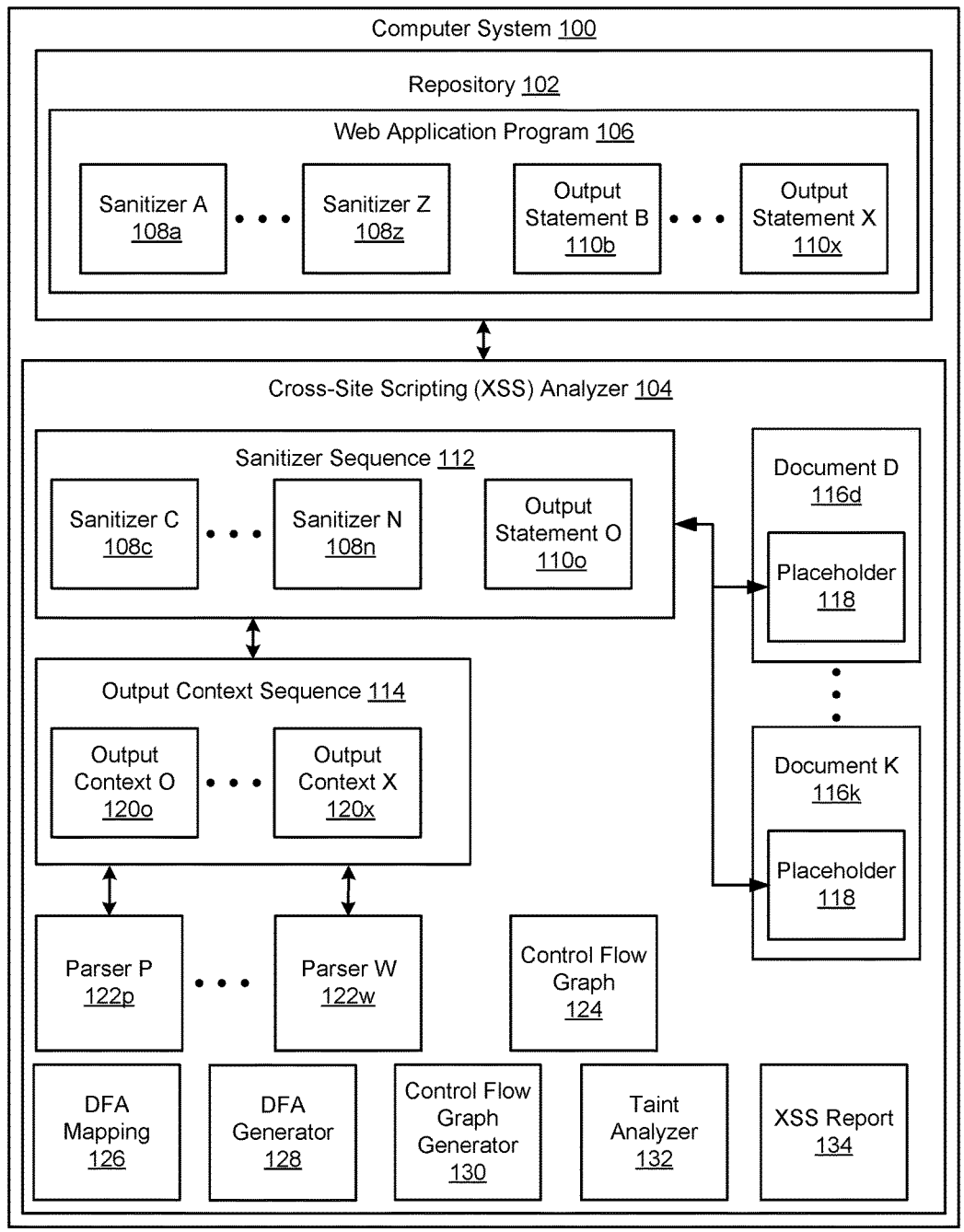
FIG. 1A, FIG. 1B, and FIG. 1C show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention involve static analysis of a web application program. In one or more embodiments of the invention, data flow analysis, static string analysis and fault-tolerant parsing are used to generate documents (e.g., HTML documents), and then analyze the generated documents to detect cross-site scripting (XSS) flaws based on inconsistent use of sanitizers. For example, a sanitizer may escape or encode specific character sequences that may have specific interpretations by a parser used in a browser. Starting from each sanitizer in the program, the data flow analysis may propagate sanitized values along definition-use chains until the sanitized values reach output statements (e.g., output statements that print a value in a browser), recording other sanitizers encountered along the way. A definition statement is in a definition-use relationship with a use statement when the definition statement defines a value used by the use statement. The analysis may determine which output statements print sanitized values and what sequences of sanitizers are applied to each output value. Then, the output contexts for the sanitized values may be determined.

Based on an output statement that prints sanitized values, a string analyzer may be used to generate possible documents that include the sanitized value of the output statement. Performance may be improved using heuristics that reduce the number of execution paths of the web application program that are analyzed, without incurring any significant loss of precision. The resulting documents may be processed using a composition of parsers that reflect how documents are processed in web browsers, in order to determine the output context of each sanitized value. For example, code may be decoded when control is passed from one parser to another, as would be the case in a browser. Through this parsing and decoding process, the behavior of a browser may be simulated, and the nesting of browser contexts tracked. Finally, when a parser encounters a sanitized output value, it may determine whether the current browser context matches the sequence of sanitizers associated with the sanitized value. A single value may require multiple sanitizations (e.g., to escape or filter different character sequences) in anticipation of multiple parsing contexts during processing of a document including that output value. If a mismatch is detected, then a potential XSS flaw may be reported. In order to match sanitizer sequences to output context sequences, it is useful to track the location in the document where the sanitized output value is printed. This tracking is achieved by mapping sanitizer sequences to unique placeholders that may be retrieved from the document.

FIG. 1A shows a system in accordance with one or more embodiments of the invention. As shown in FIG. 1A, the system includes a computer system (100) that includes a repository (102) and a cross-site scripting (XSS) analyzer (104). In one or more embodiments, the computer system (100) may be the computing system (800) described with respect to FIG. 8A and the accompanying description below, or may be the client device (826) described with respect to FIG. 8B.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes a web application program (106). In one or more embodiments, a web application program (106) may be a client-server application in which the client, or the user interface may be delivered over the internet, and runs in a web browser. In one or more embodiments of the invention, the web application program (106) is any collection of source code including various software components. That is, the web application program (106) may be any collection of computer instructions written in a human-readable programming language. The web application program (106) may be transformed by a compiler program into binary machine code. Compiled machine code may then be executed by a processor (e.g., contained in computer system (100)) in order to execute the software components generated from the web application program (106).

The web application program (106) may receive input from the user through an HTTP request, perform processing on the server-side, and send back an HTTP response to be interpreted by the user's browser. The HTTP response is usually composed of several code fragments, written in different programming languages (e.g., HTML, JavaScript and CSS) that the browser will parse, interpret and render to produce the final page (i.e., document (116d-116k)) to be presented to the user.

In one or more embodiments, the web application program (106) includes sanitizers (108a-108z) and output statements (110b-110x). A sanitizer (108a-108z) may encode or replace potentially dangerous (e.g., tainted) characters with harmless equivalents. For example, a sanitizer (108a-108z) may filter or escape specific character sequences that may have specific interpretations by a parser (122p-122w) used in a browser, in order to control how the parser (122p-122w) may parse a string containing the character sequence (e.g., to treat a specific character sequence in a cautious manner). In one or more embodiments, an output statement (110b-

110x) may write a value to a document (116d-116k) in a browser, for example, in an HTTP response.

Continuing with FIG. 1A, in one or more embodiments of the invention, the XSS analyzer (104) includes a sanitizer sequence (112), an output context sequence (114), documents (116d-116k), parsers (122p-122w), a control flow graph (124), deterministic finite automaton (DFA) mapping (126), a DFA generator (128), a control flow graph generator (130), a taint analyzer (132), and an XSS report (134). The XSS analyzer (104) may be implemented in hardware (i.e., circuitry), software, or any combination thereof. The XSS analyzer (104) may perform its analysis without requiring any change to, or annotation of the web application program (106). In addition, the XSS analyzer (104) may perform its analysis without requiring execution of the web application program (106). That is, the XSS analyzer (104) may perform a static analysis of the web application program (106).

In one or more embodiments, a sanitizer sequence (112) includes a specific sequence of one or more sanitizers (108c-108n) of the web application program (106), followed by an output statement (110o) of the web application program (106). For example, each sanitizer (108c-108n) in the sanitizer sequence (112) may be designed to affect the processing of a specific parser (122p-122w) executing in a web browser (e.g., a parser for HTML, CSS, JavaScript or URI), where different characters may require specific sanitization relative to the context of a specific parser (122p-122w).

Each sanitizer sequence (112) ends with an output statement (110o) and thus writes to a document (116d-116k). A document (116d-116k) may be represented as an HTML document, XML document, or any other document representation format. Each document (116d-116k) may include a placeholder (118) corresponding to a sanitizer sequence (112). The placeholder (118) may indicate the location of a sanitized value corresponding to the output statement (110o) within a document (116d-116k) (e.g., so that the sanitized value, as well as the corresponding sanitizer sequence (112), may be easily detected within the document (116d-116k) by parsers (122p-122w)). In one or more embodiments, each sanitizer sequence (112) corresponds to a placeholder (118), such that the placeholder (118) may function as a unique tag for the sanitizer sequence (112).

Continuing with FIG. 1A, in one or more embodiments, an output context sequence (114) includes one or more output contexts (120o-120x). In one or more embodiments, an output context (120o-120x) is the programming language syntactic construct in which a value is rendered (e.g., in a document (116d-116k)). FIG. 7 shows examples of constructs in various languages that correspond to output contexts (120o-120x). XSS prevention is complicated by the fact that different output contexts (120o-120x) require different sanitizer sequences (112). For example, while the following code fragment: javascript:alert("Warning!") would trigger a pop-up if it was rendered in a URI, it would be printed as-is if it was rendered in HTML text. Proper XSS prevention thus requires context-aware sanitizers (108a-108z).

The code fragment below illustrates how a potential XSS flaw may be prevented by providing the correct sanitizer sequence (112) that includes two sanitizers (108c-108n): encodeForJavaScript and encodeForURL.

```
1 public void _jspService (HttpServletRequest request,
2   HttpServletResponse response) {
3   String value = request.getParameter("val")
4   ...
5   out.print ("<td>\n")
6   out.print (" <a href =\"javascript:appendText( '");
7   out.print (encodeForURL(encodeForJavaScript(value)));
8   out.print ("' )\" >\n");
9   out.print (" </td >\n")
10  ...
11 }
```

The web browser performs URI decoding on every URI string, whether the string is a regular URI or a JavaScript URI. However, the encodeForJavaScript sanitizer (on line 7) does not escape the % character that is used in URI encoding. Therefore, the encodeForJavaScript sanitizer (108c-108n) is wrapped in the encodeForURL sanitizer (108c-108n), to protect against a scenario where an attacker injects a URI-encoded payload (e.g., using a tainted character sequence beginning with the % character) into the val parameter (on line 3). Otherwise, in the absence of the encodeForURL sanitizer (108c-108n), the tainted payload would be left untouched by the encodeForJavaScript sanitizer (108c-108n) and would be decoded in the user's browser before being executed by the JavaScript interpreter.

Manual placement of context-sensitive sanitizers (108a-108z) may be challenging since all user inputs potentially require sanitization and it may be necessary to dynamically determine the output contexts (120o-120x) in which a value (e.g., identified by a placeholder (118) in a document (116d-116k)) will be rendered. In the general case, successful sanitization for XSS may require that the sanitizer sequence (112) match the output context sequence (114) of the value. In the example above, the value is printed in a JavaScript output context (120o-120x) that is itself nested in a URI output context (120o-120x), where this nesting needs to be reflected in the sanitizer sequence (112). Using insufficient sanitizers (108a-108z) leads to context-sensitive XSS flaws.

In one or more embodiments, the XSS analyzer (104) may include functionality to generate documents (116d-116k) that print a sanitized value of the output statement (110o) corresponding to a sanitizer sequence (112). That is, the value may be printed in a document (116d-116k) by the output statement (110o) after being sanitized by the sanitizers (108c-108n) of the sanitizer sequence (112). For example, since a focus of the XSS analysis may be an output context sequence (114) of a sanitized value, only those documents (116d-116k) containing the sanitized value may be relevant to the XSS analysis.

Continuing with FIG. 1A, in one or more embodiments, the XSS analyzer (104) includes parsers (122p-122w). Each parser (122p-122w) may be implemented in hardware (i.e., circuitry), software, or any combination thereof. Each parser (122p-122w) may correspond to a language used to process documents (116d-116k) in a browser, such as HTML, CSS, JavaScript, URI, etc. The parsers (122p-122w) may simulate the behavior of a web browser and may support transformations between code fragments in different languages used in web browsers. Control may be passed between the various parsers (122p-122w) during the processing of a document (116d-116k) in a browser. For example, one parser (122p-122w) may encounter a sequence of characters requiring decoding or interpretation by a different parser (122p-122w). In one or more embodiments, when a parser (122p-122w) encounters a sanitized value (e.g., indicated by the presence of a placeholder (118) in the document (116d-116k) being parsed), the parser (122p-122w) determines whether the sanitizer sequence (112) corresponding to the sanitized value is sufficient for the current output context sequence (114). If not, then a potential XSS flaw may be reported in an XSS report (134).

In order to keep track of nested output contexts (120o-120x), a parser (122p-122w) may maintain a stack of output contexts (120o-120x), which may be nested arbitrarily deeply. In one or more embodiments, a context switch may occur when control is passed from one parser (122p-122w) to another parser (122p-122w). In one or more embodiments, a context switch may occur when a new output context (120o-120x) is introduced within a single parser (122p-122w). Entering and exiting an output context (120o-120x) may be triggered by constructs in one or more languages. For example, FIG. 7 shows examples of constructs in various languages that may trigger a context switch. In one or more embodiments, the output context sequence (114) may include the output contexts (120o-120x) encountered during the parsing process.

In one or more embodiments, a parser (122p-122w) may be error tolerant, in order to recover from common syntactic errors (e.g., by correcting or ignoring faulty sections of an HTML document). For example, legacy web application programs (106) may generate syntactically incorrect code (e.g., since server-side technologies typically used to generate HTML pages do not enforce syntactic correctness of the produced HTML output).

Figure 1B:
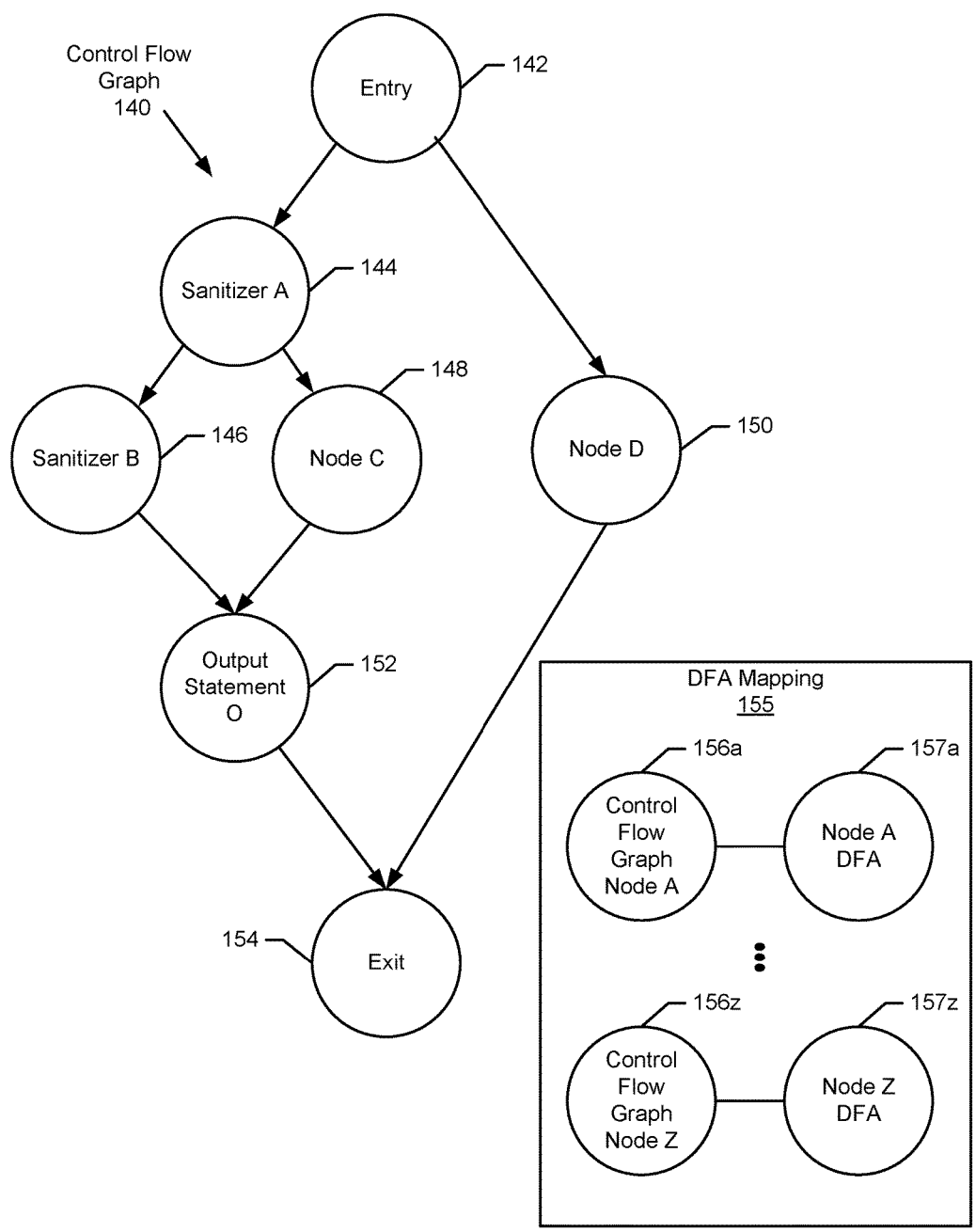

Continuing with FIG. 1A, in one or more embodiments, the control flow graph (124) may include nodes corresponding to methods (or functions) of the web application program (106), where the flow of invocations among the methods is indicated via direct edges between nodes. In one or more embodiments, the control flow graph (124) may be a sparse graph that only includes nodes corresponding to sanitizers (108a-108z) and output statements (110b-110x). FIG. 1B illustrates a control flow graph (140) that includes an entry node (142), an exit node (154) and interior nodes (144, 146, 148, 150, 152). Two of the interior nodes in FIG. 1B correspond to sanitizers (144, 146) and one of the interior nodes corresponds to an output statement (152). When two nodes are connected via a direct edge, the methods corresponding to the nodes may be said to be in an interprocedural definition-use relationship. That is, one method invokes the other method. For example, the direct edge from sanitizer A (144) to sanitizer B (146) indicates that sanitizer A (144) invokes sanitizer B (146). A path through the control flow graph (140) that includes one or more sanitizers (e.g., 144, 146) followed by an output statement (152) represents a sanitizer sequence. One example of a sanitizer sequence is the path from sanitizer A (144) to sanitizer B (146) to output statement O (152).

Returning to FIG. 1A, in one or more embodiments, the deterministic finite automaton (DFA) mapping (126) associates a DFA with each node of the control flow graph (124). This is illustrated in FIG. 1B, which shows that the DFA mapping (155) associates a node DFA (157a-157z) with each control flow graph node (156a-156z) of the control flow graph (140).

Figure 1C:
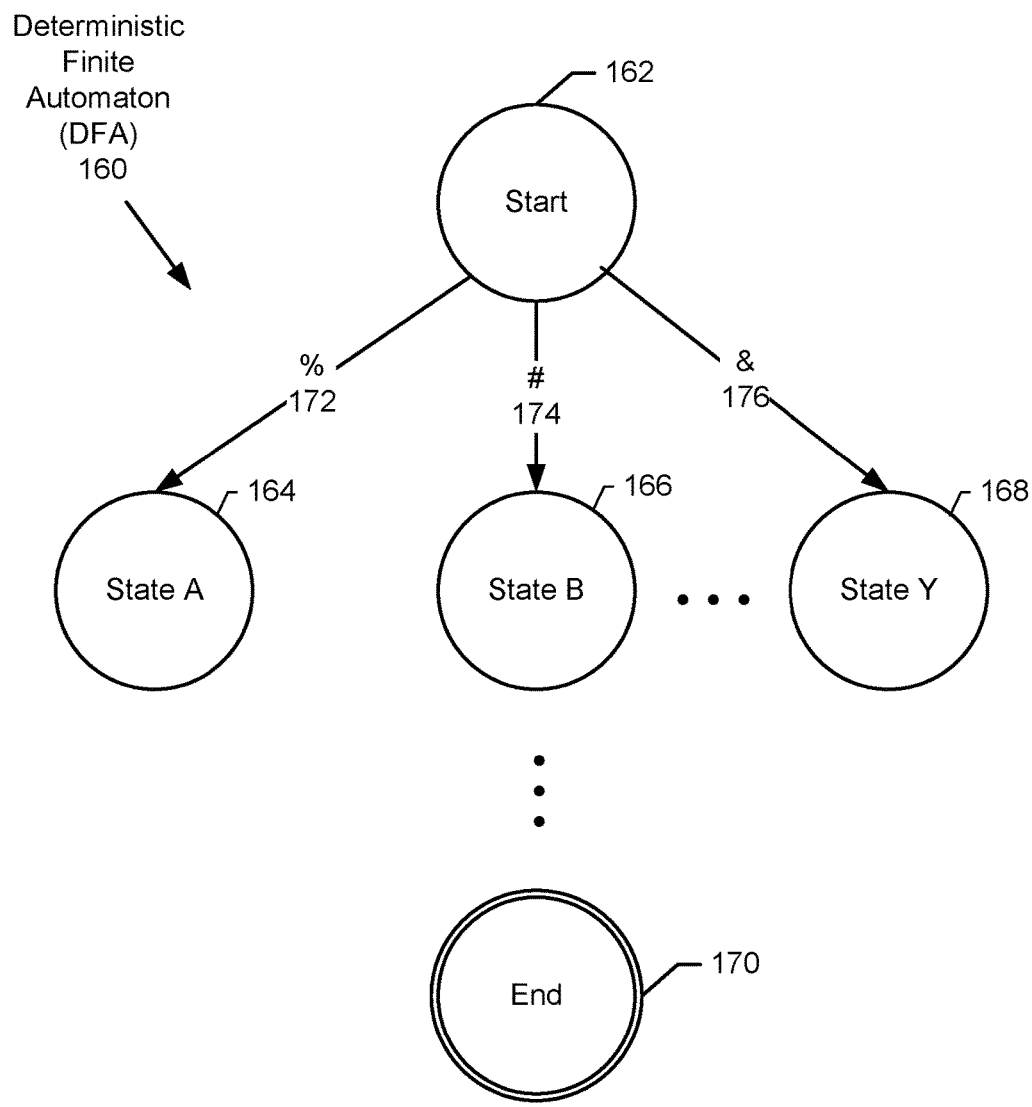

FIG. 1C illustrates a DFA (160). In one or more embodiments, a DFA (160) is a finite state machine that accepts or rejects finite strings of characters and produces a unique (i.e., deterministic) computation for each input string. In one or more embodiments, a DFA (160) includes an alphabet (i.e., set of input characters), a set of states, including a start state and one or more end states, and a set of transition rules governing transitions between states. A DFA (160) may be used to represent the result of all the string computations that lead to the definition of a string value at a given statement (e.g., sanitizers (108a-108z) and output statements (110b-110x)) of the web application program (106). In one or more embodiments, some other computational model (e.g., a non-deterministic finite automaton, a pushdown automaton, rules, etc.) may be used to represent and analyze statements of the web application program (106).

FIG. 1C illustrates a DFA (160) for a sanitizer node (e.g., node (144) or (146) in FIG. 1B) that includes a start state (162), an end state (170), interior states (164, 166, 168), and state transitions (172, 174, 176). A DFA (160) transitions from one state to another state when an input character (e.g., from an input string value) is processed. In one or more embodiments, the input character may be a symbol in an alphabet. For example, the alphabet may include any character that may be encoded using a character encoding standard, such as UTF-8. FIG. 1C illustrates a state transition (172) from the start state (162) to state A (164) triggered by reading the input character %. For example, the % character may be assigned a special interpretation by a uniform resource identifier (URI) parser (122p-122w). Therefore, a sanitizer may filter (i.e., remove) or escape the % character. For example, the character may be escaped by prefixing a backslash \ and/or other special characters to indicate that the character should be treated in a special way. Similarly, state transition (174) indicates that when character # is read from the start state (162), state B (166) is entered. In one or more embodiments, the state transitions of a DFA (160) cover all possible characters and/or all meaningful character sequences in the alphabet.

Returning to FIG. 1A, in one or more embodiments, the XSS analyzer (104) includes a DFA generator (128). The DFA generator (128) may be implemented in hardware (i.e., circuitry), software, or any combination thereof. The DFA generator (128) may include functionality to generate a DFA (e.g., (157a-157z) of FIG. 1C) to represent the result of the string computations that lead to the definition of a string value at a given statement of the web application program (106) corresponding to a node of the control flow graph (124). For example, the DFA generator (128) may be implemented by the Java String Analyzer (JSA) (Aske Simon Christensen, Anders Moller, and Michael I. Schwartzbach, Precise analysis of string expressions, In *Proc. 10th International Static Analysis Symposium (SAS)*, volume 2694 of *LNCS*, pages 1-18, Springer-Verlag, June 2003). For example, a control flow graph (124) may be provided to the JSA. The DFA generator (128) may also include functionality to generate a combined DFA corresponding to a path through the control flow graph (124). In one or more embodiments, the combined DFA includes one or more node DFAs (e.g., (157a-157z) of FIG. 1C) corresponding to the nodes in the path through the control flow graph (124). In one or more embodiments, the combined DFA may be generated by concatenating the node DFAs corresponding to the nodes in the path through the control flow graph (124). For example, the combined DFA may include the state transitions of the node DFAs corresponding to the nodes in the path through the control flow graph (124).

In one or more embodiments, the XSS analyzer (104) includes a control flow graph generator (130). The control flow graph generator (130) may be implemented in hardware (i.e., circuitry), software, or any combination thereof. The control flow graph generator (130) may include functionality to generate a control flow graph (124) to represent the flow of control through various execution paths including the methods and/or functions of the web application program (106). In one or more embodiments, the control flow graph generator (130) may follow interprocedural definition-use chains from each sanitizer (108a-108z) to output statements (110b-110x), keeping track of other sanitizers (108a-108z) encountered along the way. For example, the control flow graph generator (130) may be implemented using the Soot framework (Patrick Lam, Eric Bodden, Ondrej Lhotak, and Laurie Hendren, The Soot framework for Java program analysis: a retrospective. 2011). For example, a compiled version of the web application program (106) may be provided to Soot. This process may generate a set of sanitizer sequences (112) that includes one or more sanitizers (108c-108n), followed by an output statement (110o) that writes to a document (116d-116k). In one or more embodiments, in order to improve performance, an assumption may be made that a sanitizer (108a-108z) always receives tainted data, or receives the output of another sanitizer (108a-108z), thereby eliminating the need to track the data flow from potentially tainted sources to sanitizers (108a-108z).

In one or more embodiments, the XSS analyzer (104) includes a taint analyzer (132). The taint analyzer (132) may be implemented in hardware (i.e., circuitry), software, or any combination thereof. The taint analyzer (132) may include functionality to determine whether a path exists in a control flow graph (124). For example, in order to determine whether a sanitization sequence (112) is sufficient for the output context sequence (114) of a sanitized value, it may be necessary to determine whether a path exists from an entry point of the control flow graph (124) to a sanitizer (108c-108o) in a sanitizer sequence (112).

While FIG. 1A shows a configuration of components, other configurations may be used without departing from the scope of the invention. For example, various components may be combined to create a single component. As another example, the functionality performed by a single component may be performed by two or more components.

Figure 2:
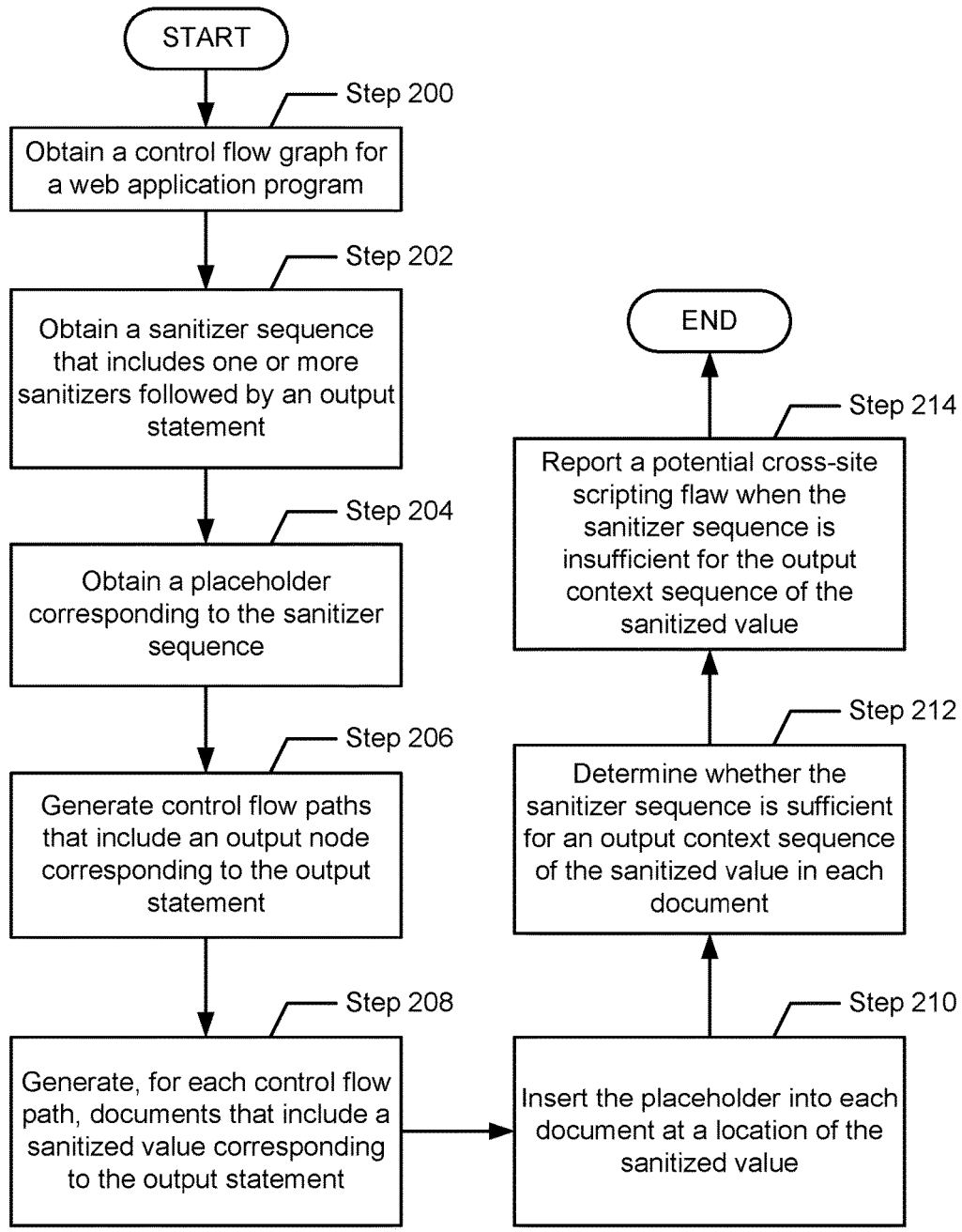
FIG. 2, FIG. 3, and FIG. 4 show flowcharts in accordance with one or more embodiments of the invention.

FIG. 2 shows a flowchart in accordance with one or more embodiments of the invention. The flowchart depicts a process for static XSS analysis of a web application program. One or more of the steps in FIG. 2 may be performed by the components of the computer system (100), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, a control flow graph for the web application program is obtained. In one or more embodiments, each node of the control flow graph corresponds to a statement in the web application program. The control flow graph may represent the possible execution paths through the web application program. In one or more embodiments, in order to improve performance, the control flow graph may be generated using "sparse" data flow analysis, by filtering out statements that are not sanitizers and are not input or output statements. For example, the Soot framework includes functionality to generate a control flow graph from a compiled version of a program. In one or more embodiments, the web application program may be obtained from a repository.

In Step 202, a sanitizer sequence that includes one or more sanitizers followed by an output statement is obtained. The sanitizer sequence may indicate a sequence of sanitizations (e.g., filtering or escaping character sequences) performed on an input value. In one or more embodiments, the one or more sanitizers and the output statement are related by interprocedural definition-use chains that are represented via nodes and direct edges in the control flow graph obtained in Step 200 above. For example, the sanitizers and output statement may correspond to nodes in the control flow graph, where direct edges between nodes indicate a definition-use relationship.

In Step 204, a placeholder corresponding to the sanitizer sequence is obtained. The placeholder may be used as a unique tag for the sanitizer sequence to indicate the location of a sanitized value (e.g., sanitized by the sanitizer sequence) corresponding to the output statement within a document (e.g., to facilitate the detection of the sanitized value within the document by parsers).

In Step 206, paths through the control flow graph that include an output node corresponding to the output statement are generated. The set of paths may be restricted to simple paths (i.e., paths without cycles) that execute the output statement, which prints the sanitized value (e.g., in a document) that represents the focus of the XSS analysis. In one or more embodiments, each of the paths begins at an entry node of the control flow graph and ends at an exit node of the control flow graph. In one or more embodiments, in order to ensure that each path executes the output statement, the paths may be generated in three phases: 1) generating a first set of partial paths from the entry node to the output node, 2) generating a second set of partial paths from the output node to the exit node, and 3) assembling full paths by pairing a partial path in the first set with a partial path in the second set until each partial path has been paired at least once. In one or more embodiments, the partial paths may be generated using a modified depth-first search algorithm.

In Step 208, for each control flow path (generated in Step 206 above), documents that include a sanitized value corresponding to the output statement are generated. That is, the generated documents may be restricted to documents that output (i.e., print) the sanitized value that represents the focus of the XSS analysis. In one or more embodiments, the documents may be generated by successively examining each node in the control flow path, and performing corresponding modifications to the document based on the statement in the web application program corresponding to the node. In one or more embodiments, a computational model of the statements corresponding to the nodes of the control flow graph may be used (e.g., a deterministic finite automaton, non-deterministic finite automaton, or pushdown automaton) during the document generation process. In one or more embodiments, the generated documents may achieve complete coverage of the possible execution flows within the control flow path. For example, the generated documents may consider all possible branch points within each statement corresponding to each node of the control flow path. For example, given a sanitizer corresponding to a node in the control flow path, each possible character input processed by the sanitizer may be considered when generating the documents.

In Step 210, the placeholder is inserted into each document at a location of the sanitized value. In one or more embodiments, the placeholder may be inserted when the output statement corresponding to the sanitized value is processed.

In Step 212, it is determined whether the sanitizer sequence is sufficient for an output context sequence of the sanitized value in each document. The placeholder may be used to identify the location of the sanitized value in each document. In one or more embodiments, the determination may be based, in part, on using one or more parsers (e.g., parsers for HTML, CSS, JavaScript and/or URI) to emulate the processing of the document by a browser (e.g., by performing transformations between code fragments represented in various languages). For example, control may pass from one parser to another parser when a fragment of code in a different language is encountered. For example, the value following a href attribute in an HTML document may require parsing by a URI parser, requiring control to be transferred from an HTML parser to a URI parser when processing the href value. In web browsers, transfer of control between parsers may be preceded by a transducing step, where the original code may be transformed before control is transferred to the next parser. For example, the value following a href attribute may be URI-decoded before it is parsed by the URI parser.

In order to keep track of nested output contexts, a parser may maintain a stack of contexts. For example, the parser may push a new context on a stack when beginning a context switch, and pop the context from the stack when the context switch has completed. In one or more embodiments, a context switch may occur when control is passed from one parser to another parser. In one or more embodiments, a context switch may occur when a new context is introduced within a single parser. In one or more embodiments, the output context sequence may include the output contexts encountered during the parsing process.

In Step 214, a potential XSS flaw is reported when the sanitizer sequence is insufficient (as determined in Step 212 above) for an output context sequence of a sanitized value. In one or more embodiments, the potential XSS flaws may be organized into a report stored in a repository.

Those skilled in the art will understand that Step 204, Step 206, Step 208, Step 210, Step 212, and Step 214 of FIG. 2 may be executed for each sanitizer sequence obtained in Step 202.

Figure 3:
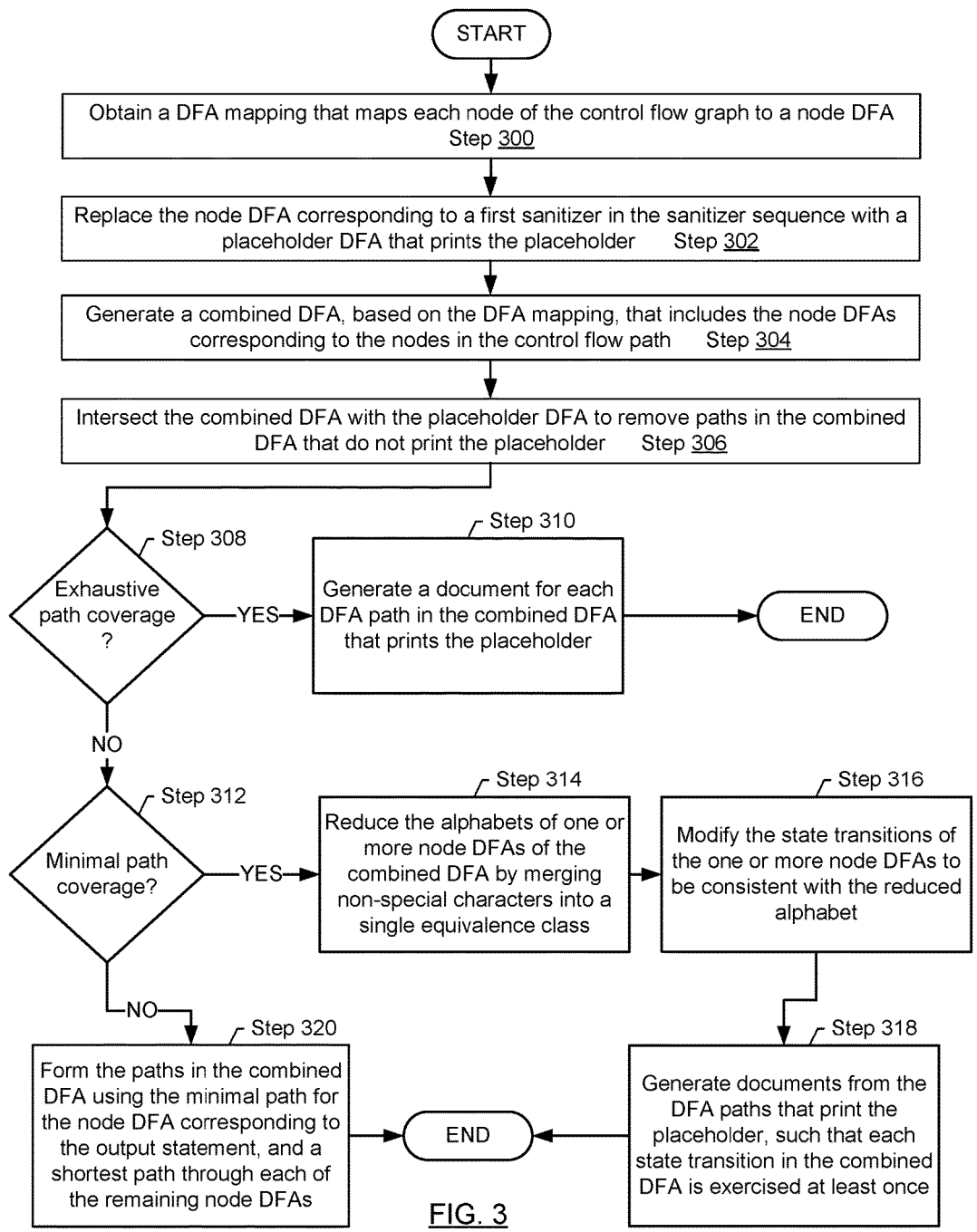

FIG. 3 shows a flowchart in accordance with one or more embodiments of the invention. The flowchart depicts a process for generating documents corresponding to a control flow path. Moreover, the flowchart in FIG. 3 may correspond to Step 208 in FIG. 2. One or more of the steps in FIG. 3 may be performed by the components of the computer system (100), discussed above in reference to FIG. 1A. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, in Step 300, a DFA mapping that maps each node of the control flow graph to a node deterministic finite automaton (DFA) is obtained. In one or more embodiments, a node DFA is a finite state machine that accepts or rejects finite strings of characters and produces a unique computation for each input string. The node DFA may include an alphabet, a set of states, including a start state and one or more end states, and a set of transition rules governing transitions between states. Each node DFA may represent the result of the string computations that lead to the definition of a string value at a given statement of the web application program corresponding to a node of the control flow graph. For example, the Java String Analyzer (JSA) includes functionality to generate a node DFA from a control flow graph.

In Step 302, the node DFA corresponding to a first sanitizer node is replaced with a placeholder DFA that prints the placeholder. For example, the placeholder DFA may print the placeholder by inserting the placeholder into a document (e.g., an HTML document). In one or more embodiments, the first sanitizer node corresponds to a first sanitizer of the sanitizer sequence. The node DFAs for the remaining nodes in the DFA mapping may be updated to reflect the replacement of the node DFA for the first sanitizer node.

In Step 304, a combined DFA is generated, based on the DFA mapping, that includes node DFAs corresponding to the nodes in the control flow path. In one or more embodiments, the combined DFA may be generated by concatenating the node DFAs corresponding to the nodes in the control flow path. For example, the combined DFA may include the state transitions of each node DFA corresponding to a node in the control flow path.

In Step 306, the combined DFA is intersected with the placeholder DFA to remove paths within the combined DFA that do not print the placeholder (i.e., paths which do not insert the placeholder into a document). That is, paths in the combined DFA may be removed if they do not correspond to the sanitizer sequence included in the control flow path, and represented by the placeholder.

If, in Step 308, exhaustive path coverage is specified, then in Step 310 a document is generated for each path in the combined DFA that prints the placeholder. Each of these paths may be an acyclic path that begins at the start state of the combined DFA and ends at an end state of the combined DFA. Depending on the complexity of the web application program and corresponding documents, the exhaustive path coverage strategy may be costly in practice.

If, in Step 312, minimal path coverage is specified, then in Step 314 the alphabets of one or more node DFAs are reduced by merging non-special characters into a single equivalence class. That is, the non-special characters may be processed in an equivalent manner. This heuristic is based on the observation that only certain characters may have the potential to induce a change of output context when parsed in a browser. For example, in one or more embodiments, for the purpose of sanitization, it may be unnecessary to treat non-special characters (e.g., numerals and letters of the English alphabet) differently. Therefore, the processing of these non-special characters may be treated uniformly. Table 1 below shows the special characters with the potential to induce a change of output context in different languages. Table 2 below shows the equivalence classes of characters that may trigger a context switch.

TABLE 1

Special Characters that may Induce a Change of Output Context

| Context scope | Special character classes |
| --- | --- |
| HTML | < > & " ' = ! – \ / [:white:] |
| CSS | " ' ( ) [ ] : ; < > = \ ! [:white:] |
| JavaScript | " ' \ |
| URI | : ; , / |

TABLE 2

Character Equivalence Classes
20 syntax-equivalency character classes

| '<' | '\"' | '–' | '[' | ':' |
| --- | --- | --- | --- | --- |
| '>' | '\\' | '/' | ']' | ';' |
| '&' | '=' | '{' | '(' | All white characters |
| '"' | '!' | '}' | ')' | All other characters |

In Step 316, the state transitions of each of the one or more node DFAs are modified to be consistent with the reduced alphabets (from Step 314 above). This heuristic may reduce the number of paths in the combined DFA to consider. This heuristic may also avoid the practical limitations of the exhaustive path coverage (described in Step 310 above) above, while maintaining comprehensive context-sensitive XSS flaw detection capability.

In Step 318, documents are generated from the paths of the combined DFA that print the placeholder such that each state transition of the combined DFA is exercised at least once. That is, documents may be generated until there are no un-exercised state transitions remaining in the combined DFA. In one or more embodiments, the various state transitions encountered in the combined DFA may be tracked. When a state transition is encountered, it may be compared to the tracked state transitions to determine whether or not the state transition has already been exercised. In one or more embodiments, a path may be heuristically selected for processing based on the number of un-exercised state transitions in the DFA path. This heuristic may further reduce the number of DFA paths to consider. The intuition behind this heuristic is that the generated documents may collectively cover all relevant execution flows, as embodied in the state transitions of the combined DFA, and therefore all relevant combinations of sanitizer sequences may be addressed.

As an alternative to the exhaustive path coverage strategy (described in Step 310) and minimal path coverage strategy (described in Step 314, Step 316 and Step 318), a shortest path coverage strategy may be employed. In Step 320, paths in the combined DFA are formed using a shortest path through each of one or more node DFAs. The shortest path of a node DFA may be any path from the start state of the node DFA to an end state of the node DFA containing the smallest number of state transitions relative to the other paths of the node DFA. In other words, the shortest path may correspond to the shortest string that the node DFA is able to generate. In one or more embodiments, an exception may be made for the node DFA corresponding to the output statement, whose paths may instead be generated using the minimal path coverage algorithm described above in Step 314, Step 316 and Step 318.

The shortest path approach is an even more aggressive heuristic that represents a further refinement of the minimal path coverage strategy, by using the minimal path coverage for the node DFA corresponding to the output statement, and generating a shortest path for the other node DFAs. The intuition behind the shortest path strategy is that the output statement represents a focal point of the XSS analysis, whereas analysis of the remaining statements may be aggressively optimized without losing significant precision. Empirical results have in fact shown that applying the shortest path heuristic optimization does not sacrifice precision. This may be due to the deployment of similar, structured design patterns in the web application programs that have been analyzed with this method, resulting in similar output contexts in the generated documents. That is, for reasons of simplicity and maintainability, such web application programs often do not exercise the full power and complexity of the underlying programming language.

Figure 4:
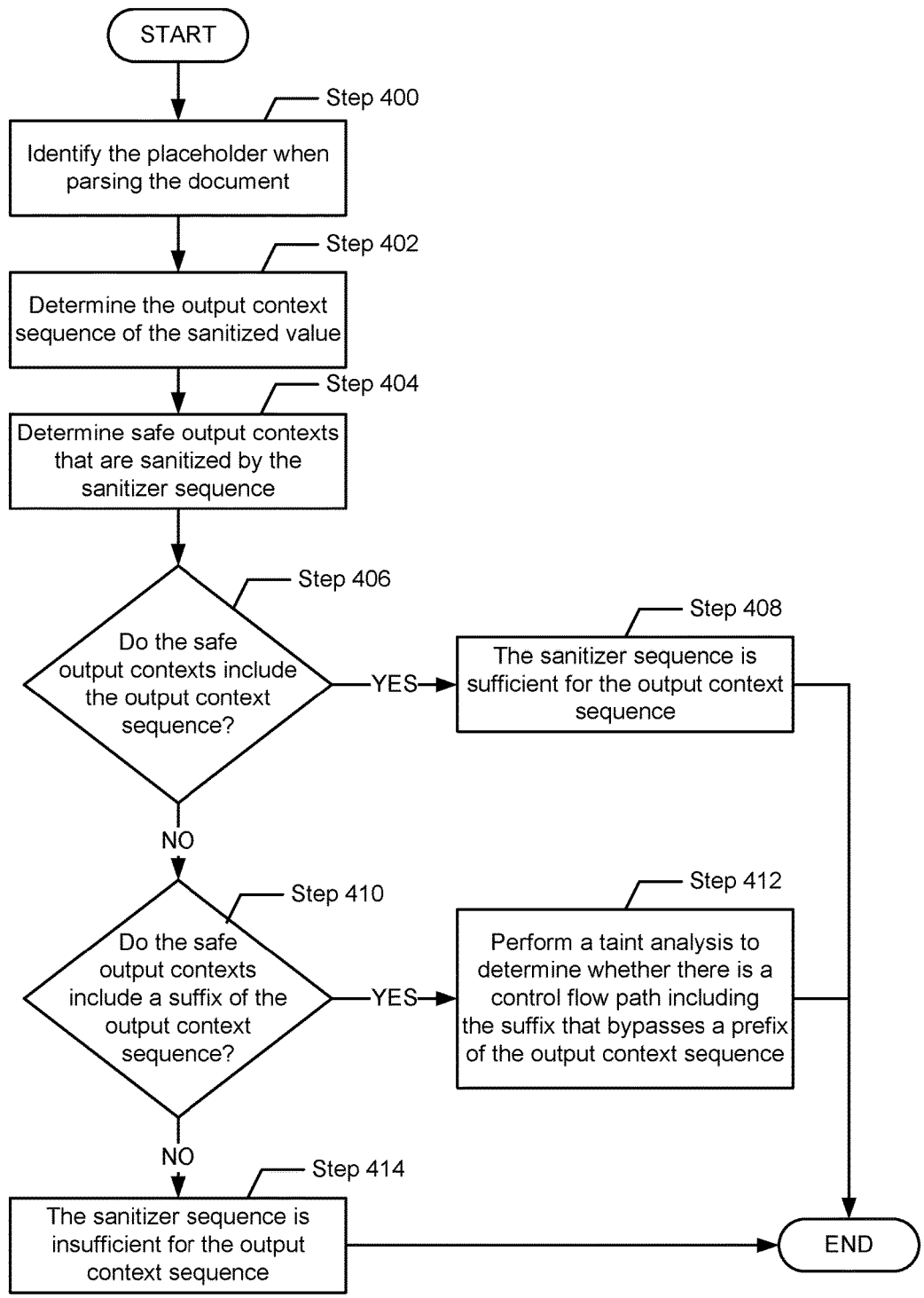

FIG. 4 shows a flowchart in accordance with one or more embodiments of the invention. The flowchart depicts a process for determining whether a sanitizer sequence is sufficient for an output context sequence of a sanitized value. Moreover, the flowchart in FIG. 4 may correspond to Step 212 in FIG. 2. One or more of the steps in FIG. 4 may be performed by the components of the computer system (100), discussed above in reference to FIG. 1A. In one or more embodiments of the invention, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

Initially, in Step 400, the placeholder is identified when parsing the document. In one or more embodiments, the parsing may begin with the parser corresponding to the representation of the output of the web application program. For example, if the web application program produces HTML documents, parsing may begin with an HTML parser.

In Step 402, the output context sequence of the sanitized value is determined. In one or more embodiments, the output context sequence may be determined by noting each context switch triggered during the parsing process, as described in Step 212 above. In one or more embodiments, context switches may be governed by rules based on a model of output contexts, as shown in FIG. 7.

In Step 404, safe output contexts that are sanitized by the sanitizer sequence are determined. The safe output contexts may be determined by noting the output context associated with each sanitizer in the sanitizer sequence. In one or more embodiments, the contexts associated with each sanitizer in the sanitizer sequence may be indicated by rules that match each sanitizer to an output context, for example, based on a model of output contexts, as shown in FIG. 7.

In Step 406, it is determined whether the safe output contexts include the output context sequence of the sanitized value. If so, then in Step 408 the sanitizer sequence is determined to be sufficient for the output context sequence of the sanitized value.

Alternatively, in Step 410, it is determined whether the safe output contexts include a suffix of the output context sequence of the sanitized value. If not, then in Step 414 the sanitizer sequence is determined to be insufficient for the output context sequence of the sanitized value.

In one or more embodiments, a correction to the sanitizer sequence may be proposed in order to make the sanitizer sequence sufficient for the output context sequence of the sanitized value. For example, one or more output contexts of the sanitized value that have no matching sanitizers may be identified. The lack of matching sanitizers may indicate a bug which may be corrected by adding the matching sanitizers to the sanitizer sequence. As another example, an incorrect sanitizer (e.g., that does not match any output context of the sanitized value) may be identified relative to the output context of the sanitized value. An incorrect sanitizer may be corrected by replacing the incorrect sanitizer with a sanitizer that matches the corresponding output context of the sanitized value.

In Step 412, a taint analysis is performed to determine whether there is a control flow path including the suffix of the output context sequence that bypasses a prefix of the output context sequence. That is, the sanitizer sequence may be determined to be sufficient for the output context sequence of the sanitized value if there is no potentially tainted control flow path in the control flow graph (e.g., starting at an entry point of the control flow graph) that includes the suffix of the output context sequence and also bypasses a prefix of the output context sequence. In other words, sanitizing the suffix of the output context sequence of the sanitized value may be sufficient provided that there is no alternate control flow path to the sanitized value that requires additional sanitization beyond the suffix of the output context sequence. Otherwise, if such an alternate control flow path exists, then the sanitization may be insufficient (i.e., only sanitizing the suffix of the output context sequence without sanitizing the additional output contexts preceding the suffix).

Figure 5:
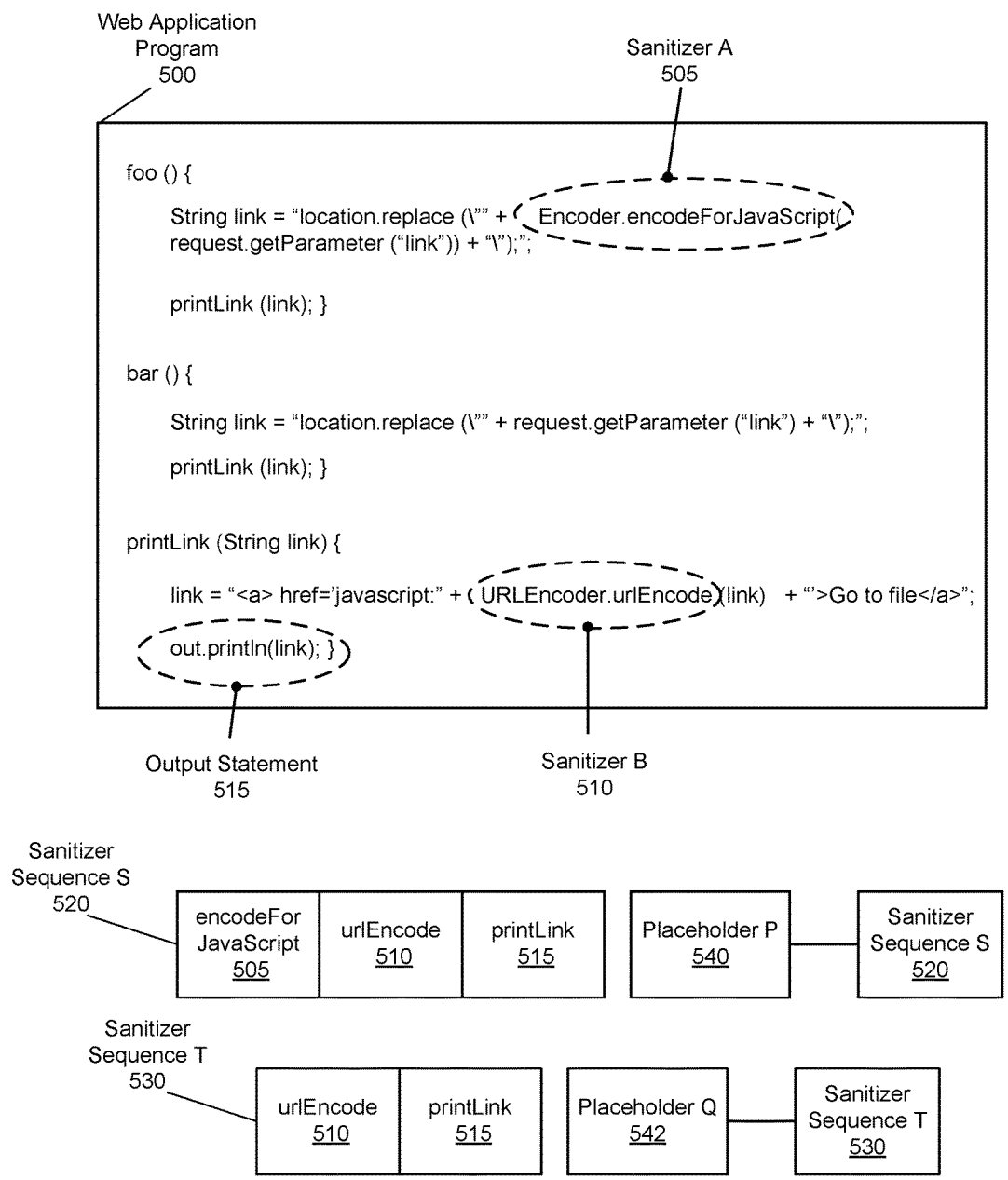
Figure 6:
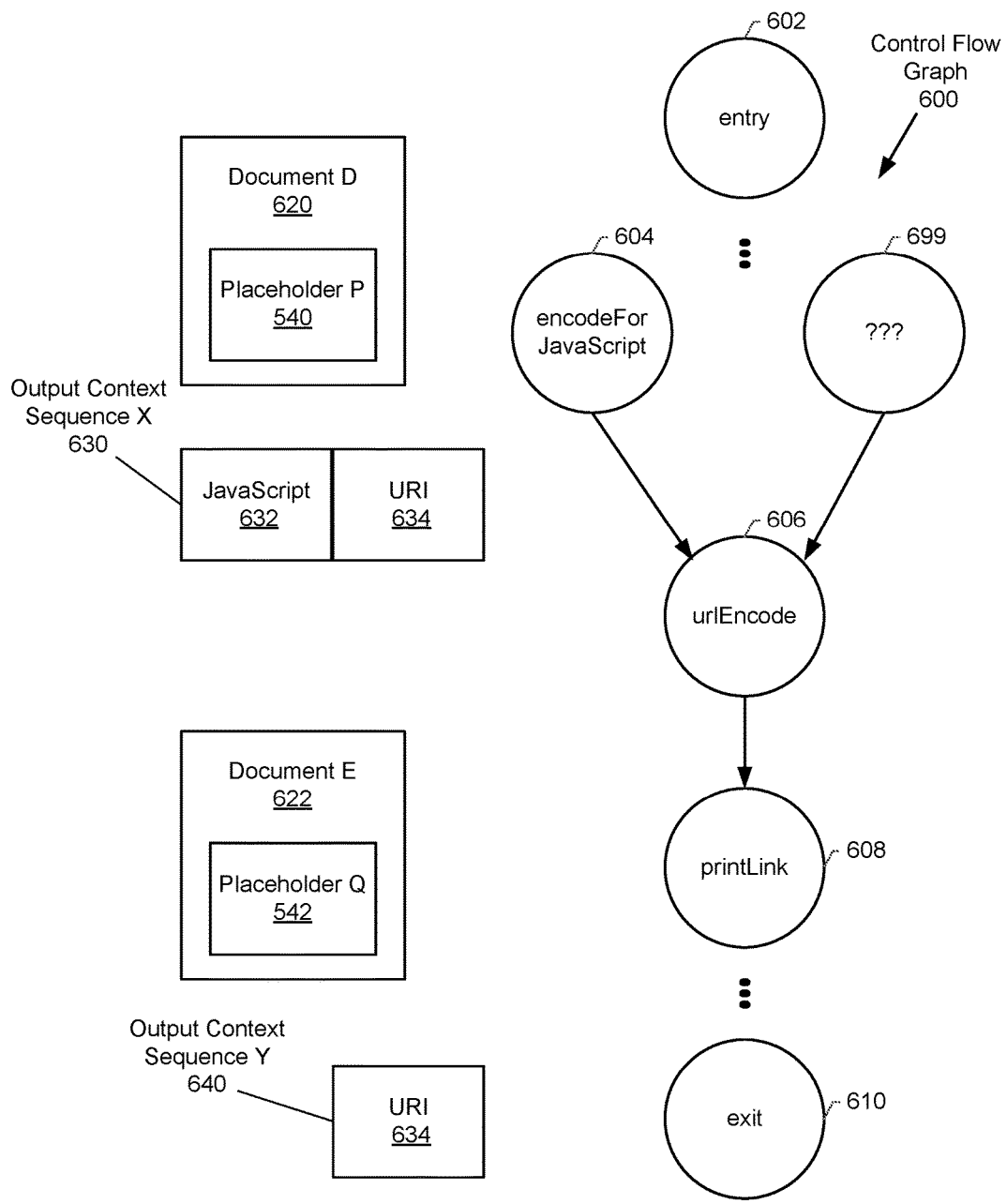

The following example is for explanatory purposes only and not intended to limit the scope of the invention. FIG. 5 and FIG. 6 show an implementation example in accordance with one or more embodiments of the invention. FIG. 5 shows a web application program (500) that includes two sanitizers (505, 510) and an output statement (515). Sanitizer A (505) sanitizes (i.e., encodes) a value relative to a JavaScript output context, and sanitizer B (510) sanitizes a value relative to a URI output context. The web application program (500) includes two sanitizer sequences (520, 530). Sanitizer sequence S (520) includes two sanitizers (505, 510) and the output statement (515). Sanitizer sequence T (530) includes one sanitizer (510) and the output statement (515). Sanitizer sequence S (520) has a corresponding placeholder P (540), and sanitizer sequence T (530) has a corresponding placeholder Q (542).

FIG. 6 shows a control flow graph (600) corresponding to the web application program (500) of FIG. 5. The control flow graph (600) starts with an entry node (602), ends with an exit node (610), and contains sanitizer nodes (604, 606) and an output node (608) corresponding to the sanitizers (505, 510) and output statement (515), respectively, of the web application program (500). Document D (620) is generated based on the control flow path that includes nodes (604, 606, 608), which corresponds to sanitizer sequence S (520) of FIG. 5. Document D (620) includes the placeholder P (540) indicating the location of the sanitized value within document D (620) that corresponds to sanitizer sequence S (520). Document D (620) may be generated using a combined DFA based on node DFAs corresponding to the nodes (604, 606, 608) of the control flow path. Exhaustive path coverage, minimal path coverage, or shortest path coverage may be used to generate one or more documents based on the combined DFA corresponding to the control flow path that includes the sanitization sequence S (520).

The nesting of output contexts may be dynamically tracked during the parsing of document D (620). When placeholder P (540) is encountered during the parsing of document D (620), the tracked output context sequence X (630) is JavaScript (632) followed by URI (634). The output context sequence X (630) is then compared to the output contexts that are safely sanitized by the sanitizer sequence S (520). The output contexts that are safely sanitized by the sanitizer sequence S (520) are also JavaScript (632) and URI (634). Since the output context sequence X (630) is included in the safely sanitized contexts, then it is determined that the sanitizer sequence S (520) is sufficient for the output context of the sanitized value (i.e., the "link" variable in the printLink output statement (515)). That is, the nesting of output contexts of the sanitized value is safely reflected in the sanitizer sequence S (520).

Subsequently, document E (622) is generated based on the control flow path that includes nodes (606, 608), which corresponds to sanitizer sequence T (530) of FIG. 5. Document E (622) includes the placeholder Q (542) indicating the location of the sanitized value within document E (622) that corresponds to sanitizer sequence T (530).

When placeholder Q (542) is encountered during the parsing of document E (622), the tracked output context sequence Y (640) is simply URI (634). The output context sequence Y (640) is then compared to the contexts that are safely sanitized by the sanitizer sequence T (530). Since the output context sequence Y (640) is a suffix of the safely sanitized contexts (i.e., JavaScript (632) followed by URI (634)), then a taint analysis is used to determine whether sanitizer sequence T (530) is sufficient for the output context of the sanitized value (i.e., the "link" variable in the printLink output statement (515)). The taint analysis determines whether there is an alternate control flow path, for example, that includes a path through a node (699), whose corresponding output context sequence includes the suffix (i.e., URI (634)) of the safely sanitized contexts, but does not include the prefix (i.e., JavaScript (632)) of the safely sanitized contexts. If such an alternate control flow path exists, then it is determined that the sanitizer sequence T (530) is insufficient for the output context of the sanitized value, and an XSS flaw will be reported. Otherwise, if no such alternate control flow path exists, then it is determined that the sanitizer sequence T (530) is indeed sufficient for the output context of the sanitized value.

Figure 8A:
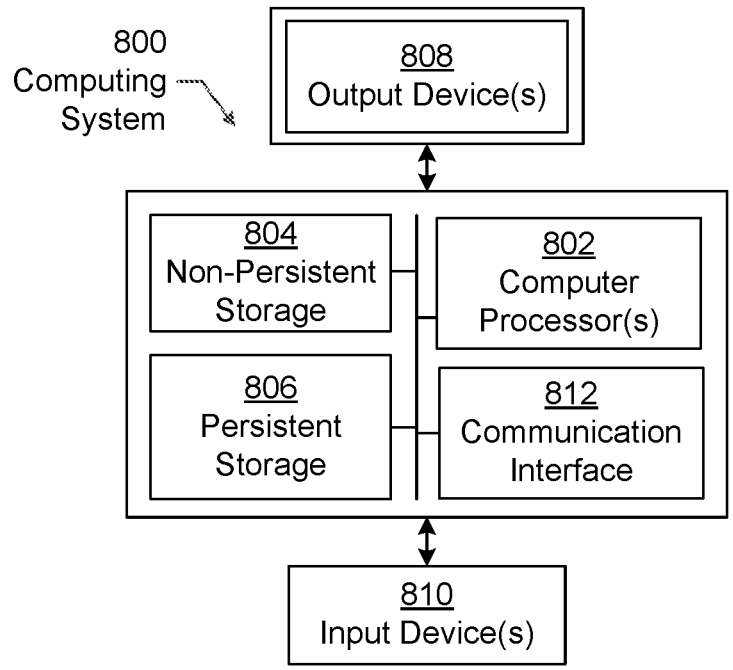
FIG. 8A and FIG. 8B show computing systems in accordance with one or more embodiments of the invention.

Embodiments of the invention may be implemented on a computing system. Any combination of mobile, desktop, server, router, switch, embedded device, or other types of hardware may be used. For example, as shown in FIG. 8A, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 8B:
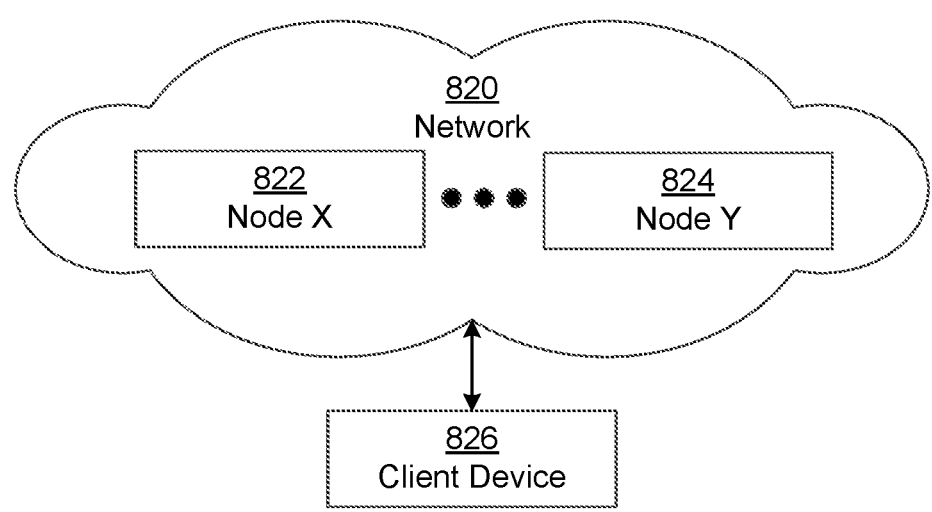

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (800) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8A. Further, the client device (826) may include and/or perform all or a portion of one or more embodiments of the invention.

The computing system or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 8A and the nodes and/or client device in FIG. 8B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for statically analyzing a web application program, comprising:
   obtaining a control flow graph for the web application program, wherein the control flow graph comprises a plurality of nodes, wherein each node of the plurality of nodes corresponds to a statement in the web application program;
   obtaining a sanitizer sequence comprising one or more sanitizers followed by an output statement;
   obtaining a placeholder corresponding to the sanitizer sequence;
   generating a plurality of control flow paths from an entry node of the control flow graph to an exit node of the control flow graph, wherein each control flow path of the plurality of control flow paths comprises an output node that corresponds to the output statement;
   generating, for each control flow path of the plurality of control flow paths, a plurality of documents, wherein each document of the plurality of documents comprises a sanitized value corresponding to the output statement;
   inserting the placeholder into each document of the plurality of documents at a location of the sanitized value;
   determining whether the sanitizer sequence is sufficient for an output context sequence of the sanitized value in each document of the plurality of documents by:
      determining a plurality of safe output contexts that are sanitized by the sanitizer sequence, and
      determining whether the plurality of safe output contexts comprise a suffix of the output context sequence of the sanitized value,
      wherein the output context sequence of the sanitized value comprises a plurality of output contexts each comprising a syntactic construct in which the sanitized value is rendered; and
   reporting a potential cross-site scripting flaw when the sanitizer sequence is insufficient for the output context sequence of the sanitized value.

2. The method of claim 1, wherein generating, for each control flow path, the plurality of documents comprises:
   obtaining a deterministic finite automaton (DFA) mapping that maps each node of the control flow path to a node DFA, wherein the node DFA comprises an alphabet, a plurality of states, and a plurality of state transitions;
   generating, based on the DFA mapping, a combined DFA comprising a plurality of node DFAs, wherein the combined DFA comprises the plurality of state transitions of each node DFA of the plurality of node DFAs; and
   generating a document for each of a plurality of paths in the combined DFA, wherein each path of the plurality of paths prints the placeholder.

3. The method of claim 2, further comprising:
   reducing the alphabet of each of one or more node DFAs of the combined DFA by merging non-special characters into a single equivalence class to obtain a reduced alphabet; and modifying the plurality of state transitions of each of the one or more node DFAs to be consistent with the reduced alphabet,
wherein the plurality of paths in the combined DFA exercises each state transition of the combined DFA at least once.

4. The method of claim 3, wherein modifying the plurality of state transitions of each of the one or more node DFAs is performed only on a node DFA corresponding to the output statement, wherein the method further comprises:
forming the plurality of paths of the combined DFA using a shortest path through each of one or more node DFAs of the combined DFA, wherein the shortest path comprises one or more state transitions of the corresponding node DFA.

5. The method of claim 1, wherein determining whether the sanitizer sequence is sufficient for the output context sequence of the sanitized value in each document further comprises:
identifying the placeholder when parsing the document.

6. A system for statically analyzing a web application program, comprising:
a processor;
a memory comprising instructions that, when executed by the processor, cause the processor to:
obtain a control flow graph for the web application program, wherein the control flow graph comprises a plurality of nodes, wherein each node of the plurality of nodes corresponds to a statement in the web application program;
obtain a sanitizer sequence comprising one or more sanitizers followed by an output statement;
obtain a placeholder corresponding to the sanitizer sequence;
generate a plurality of control flow paths from an entry node of the control flow graph to an exit node of the control flow graph, wherein each control flow path of the plurality of control flow paths comprises an output node that corresponds to the output statement;
generate, for each control flow path of the plurality of control flow paths, a plurality of documents, wherein each document of the plurality of documents comprises a sanitized value corresponding to the output statement;
insert the placeholder into each document of the plurality of documents at a location of the sanitized value;
determine whether the sanitizer sequence is sufficient for an output context sequence of the sanitized value in each document of the plurality of documents by:
determining a plurality of safe output contexts that are sanitized by the sanitizer sequence, and
determining whether the plurality of safe output contexts comprise a suffix of the output context sequence of the sanitized value,
wherein the output context sequence of the sanitized value comprises a plurality of output contexts each comprising a syntactic construct in which the sanitized value is rendered; and
report a potential cross-site scripting flaw when the sanitizer sequence is insufficient for the output context sequence of the sanitized value; and
a repository, configured to store at least the web application program.

7. The system of claim 6, wherein generating, for each control flow path, the plurality of documents comprises:

obtaining a DFA mapping that maps each node of the control flow path to a node DFA, wherein the node DFA comprises an alphabet, a plurality of states, and a plurality of state transitions;
generating, based on the DFA mapping, a combined DFA comprising a plurality of node DFAs, wherein the combined DFA comprises the plurality of state transitions of each node DFA of the plurality of node DFAs; and
generating a document for each of a plurality of paths in the combined DFA, wherein each path of the plurality of paths prints the placeholder.

8. The system of claim 7, further comprising:
reducing the alphabet of each of one or more node DFAs of the combined DFA by merging non-special characters into a single equivalence class to obtain a reduced alphabet; and
modifying the plurality of state transitions of each of the one or more node DFAs to be consistent with the reduced alphabet,
wherein the plurality of paths in the combined DFA exercises each state transition of the combined DFA at least once.

9. The system of claim 8, wherein modifying the plurality of state transitions of each of the one or more node DFAs is performed only on a node DFA corresponding to the output statement, wherein the method further comprises:
forming the plurality of paths of the combined DFA using a shortest path through each of one or more node DFAs of the combined DFA, wherein the shortest path comprises one or more state transitions of the corresponding node DFA.

10. The system of claim 6, wherein determining whether the sanitizer sequence is sufficient for the output context sequence of the sanitized value in each document further comprises:
identifying the placeholder when parsing the document.

11. A non-transitory computer readable medium comprising instructions that, when executed by a processor, perform a method for statically analyzing a web application program, the method comprising:
obtaining a control flow graph for the web application program, wherein the control flow graph comprises a plurality of nodes, wherein each node of the plurality of nodes corresponds to a statement in the web application program;
obtaining a sanitizer sequence comprising one or more sanitizers followed by an output statement;
obtaining a placeholder corresponding to the sanitizer sequence;
generating a plurality of control flow paths from an entry node of the control flow graph to an exit node of the control flow graph, wherein each control flow path of the plurality of control flow paths comprises an output node that corresponds to the output statement;
generating, for each control flow path of the plurality of control flow paths, a plurality of documents, wherein each document of the plurality of documents comprises a sanitized value corresponding to the output statement;
inserting the placeholder into each document of the plurality of documents at a location of the sanitized value;
determining whether the sanitizer sequence is sufficient for an output context sequence of the sanitized value in each document of the plurality of documents by:
determining a plurality of safe output contexts that are sanitized by the sanitizer sequence, and determining whether the plurality of safe output contexts comprise a suffix of the output context sequence of the sanitized value, wherein the output context sequence of the sanitized value comprises a plurality of output contexts each comprising a syntactic construct in which the sanitized value is rendered; and reporting a potential cross-site scripting flaw when the sanitizer sequence is insufficient for the output context sequence of the sanitized value.

12. The non-transitory computer readable medium of claim 11, wherein generating, for each control flow path, the plurality of documents comprises:

obtaining a DFA mapping that maps each node of the control flow path to a node DFA, wherein the node DFA comprises an alphabet, a plurality of states, and a plurality of state transitions;

generating, based on the DFA mapping, a combined DFA comprising a plurality of node DFAs, wherein the combined DFA comprises the plurality of state transitions of each node DFA of the plurality of node DFAs; and generating a document for each of a plurality of paths in the combined DFA, wherein each path of the plurality of paths prints the placeholder.

13. The non-transitory computer readable medium of claim 12, further comprising:

reducing the alphabet of each of one or more node DFAs of the combined DFA by merging non-special characters into a single equivalence class to obtain a reduced alphabet; and modifying the plurality of state transitions of each of the one or more node DFAs to be consistent with the reduced alphabet, wherein the plurality of paths in the combined DFA exercises each state transition of the combined DFA at least once.

14. The non-transitory computer readable medium of claim 13, wherein modifying the plurality of state transitions of each of the one or more node DFAs is performed only on a node DFA corresponding to the output statement, wherein the method further comprises:

forming the plurality of paths of the combined DFA using a shortest path through each of one or more node DFAs of the combined DFA, wherein the shortest path comprises one or more state transitions of the corresponding node DFA.

15. The non-transitory computer readable medium of claim 11, wherein determining whether the sanitizer sequence is sufficient for the output context sequence of the sanitized value in each document further comprises:

identifying the placeholder when parsing the document.

* * * * *